United States Patent [19]
Noh et al.

[11] Patent Number: 5,576,764
[45] Date of Patent: Nov. 19, 1996

[54] AUTOMATIC FOCUSING APPARATUS AND METHOD FOR VIDEO CAMERA SYSTEM BY PROCESSING LUMINESCENCE SIGNAL

[75] Inventors: Dae H. Noh; Joong S. Song, both of Seoul, Rep. of Korea

[73] Assignee: Goldstar Co., Ltd., Seoul, Rep. of Korea

[21] Appl. No.: 355,204

[22] Filed: Dec. 8, 1994

Related U.S. Application Data

[63] Continuation of Ser. No. 57,839, May 7, 1993, abandoned.

[30] Foreign Application Priority Data

| May 7, 1992 | [KR] | Rep. of Korea | 7714/1992 |
| May 15, 1992 | [KR] | Rep. of Korea | 8214/1992 |
| May 15, 1992 | [KR] | Rep. of Korea | 8215/1992 |
| May 15, 1992 | [KR] | Rep. of Korea | 8216/1992 |

[51] Int. Cl.[6] .................................................. H04N 5/232
[52] U.S. Cl. ........................... 348/356; 348/345; 348/349
[58] Field of Search .......................... 358/227; 348/345, 348/348, 349, 347, 351, 353, 354, 356, 358; 354/400, 403, 404; H04N 5/232

[56] References Cited

U.S. PATENT DOCUMENTS

| 4,690,001 | 9/1987 | Harvey et al. | 348/345 |
| 4,812,912 | 3/1989 | Iida et al. | 358/227 |
| 4,872,058 | 10/1989 | Baba et al. | 358/227 |
| 4,985,777 | 1/1991 | Kawada | 358/227 |
| 5,182,649 | 1/1993 | Miyazaki | 358/227 |

FOREIGN PATENT DOCUMENTS

| 263275 | 3/1990 | Japan | H04N 5/232 |
| 3162076 | 7/1991 | Japan | H04N 5/232 |

*Primary Examiner*—Safet Metjahic

[57] ABSTRACT

A focusing apparatus of a video camera system and a focusing method, capable of achieving a precise focusing even for an image with both a boundary between white and black and a boundary between white and gray. The focusing apparatus achieves a precise focusing even for an image with both a horizontal luminance signal level and a vertical luminance signal level. The focusing apparatus also achieves a precise focusing even for an object bearing the same kind of colors without a difference in luminance signal level, but with different color concentrations or different kinds of colors with a difference in luminance signal level.

7 Claims, 11 Drawing Sheets

AUTOMATIC FOCUSING APPARATUS AND METHOD FOR VIDEO CAMERA SYSTEM BY PROCESSING LUMINESCENCE SIGNAL

This application is a continuation of application Ser. No. 08/057,839 filed on May 7, 1993, now abandoned.

BACKGROUND OF THE INVENTION

1. Field of the Invention

The present invention relates to a video camera system comprising a camera and a video cassette recorder which are integral with each other, and more particularly to an automatic focusing apparatus of such a video camera system and an automatic focusing method.

2. Description of the Prior Art

As well known, such a video camera system which is called a camcorder comprises mainly a camera unit and a video cassette recorder unit. Generally, the camera unit includes a focusing lens for adjusting a focus of an object. The focusing lens is adapted to move in response to a focusing signal generated according to a level of a luminance signal. By the movement of the focusing lens, the focus of the object is adjusted.

Figure 1A:
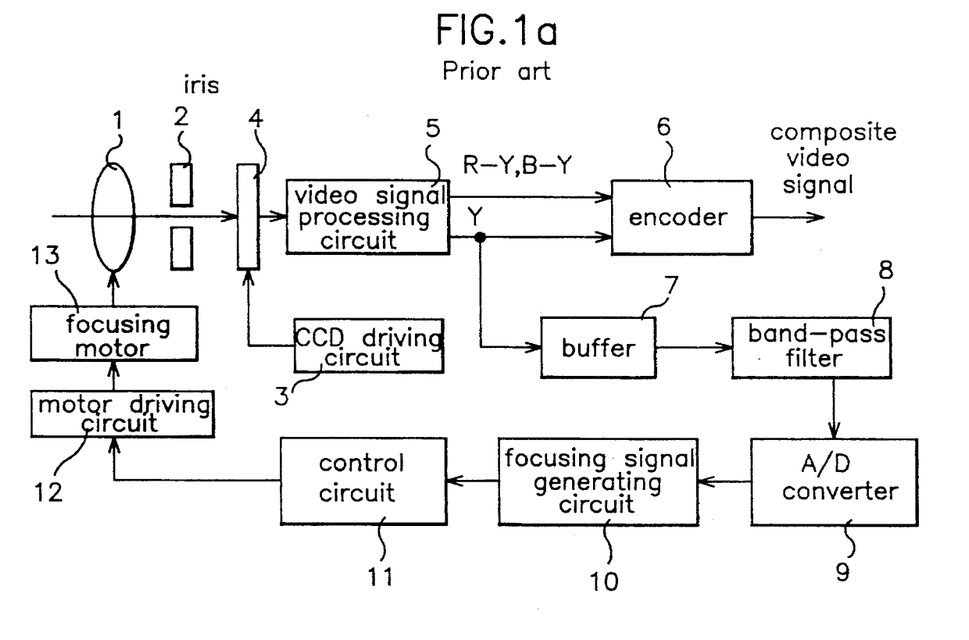
FIG. 1a is a block diagram of a conventional focusing apparatus employed in a video camera system.
Figure 1B:
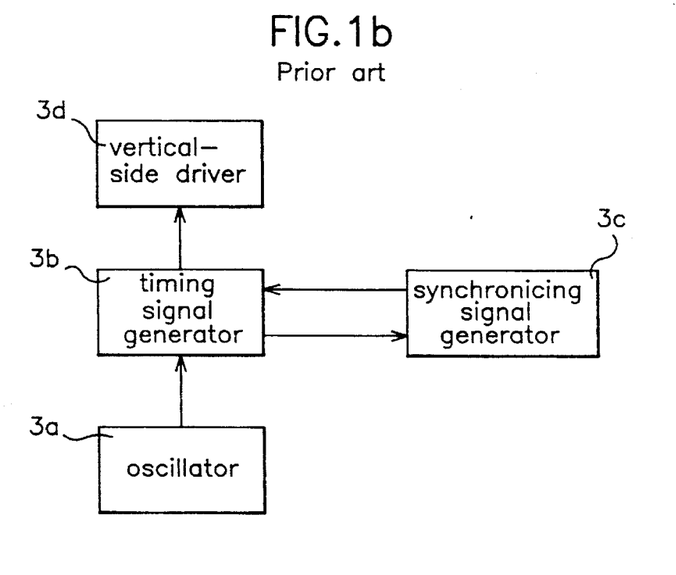

Referring to FIGS. 1a and 1b, there is illustrated a conventional video camera system. In the drawings, only a camera unit of the video camera system equipped with a focusing apparatus is shown.

As shown in FIG. 1a, the focusing apparatus comprises a focusing lens 1 for adjusting a focus of an object to be shot, an iris 2 for controlling the amount of incident light according to the illuminance of surroundings, and a charge coupled device (CCD) 4 for converting an optical video signal indicative of an image of the object and received via the focusing lens 1 and the iris 2, into an electrical video signal under a control of a CCD driving circuit 3. The focusing apparatus also comprises a video signal processing circuit 5 for processing an output signal from the CCD 4 and generating color difference signals R-Y (red luminance signal) and B-Y (blue luminance signal) and a luminance signal Y, an encoder 6 for encoding output signals from the video signal processing circuit 5 and outputting a composite video signal, a buffer 7 for buffering the luminance signal Y from the video signal processing circuit 5, a band-pass filter 8 for passing a particular frequency band of the luminance signal Y outputted from the buffer 7, and an analog/digital converter 9 for converting an output signal from the filter 8 into a digital signal. Also, a focusing signal generating circuit 10 is provided which is adapted to integrate an output signal from the analog/digital converter 9 by the unit of one horizontal interval, sum integrated values obtained by the integration and output the result as a focusing signal. The focusing apparatus also comprises a control circuit 11 (generally, a microcomputer) for generating a control signal for focusing, according to an output signal from the focusing signal generating circuit 10 and a motor driving circuit 12 for driving a focusing motor 13 according to the control signal from the control circuit 11 and thus moving the focusing lens 1 for focusing.

Now, operation of the focusing apparatus with the above-mentioned construction of FIG. 1a will be described.

As an object is shot by the video camera system which is powered on, an optical video signal indicative of an image of the object is fed to the CCD 4 via the focusing lens 1 and the iris 2. Upon receiving the optical video signal, the CCD 4 is enabled under a control of the CCD driving circuit 3 so that it converts the received optical video signal into an electrical video signal which is, in turn, sent to the video signal processing circuit 5. The video signal processing circuit 5 processes the received video signal to device it into color difference signals R-Y and B-Y and a luminance signal Y. The encoder 6 receives the color difference signals R-Y and B-Y and luminance signal Y from the video signal processing circuit 5 and encodes them to generate a composite video signal.

The luminance signal Y from the video signal processing circuit 5 is also sent to the buffer 7 in which it is buffered and then sent to the band-pass filter 8. The band-pass filter 8 outputs only a particular frequency band of the luminance signal Y which is, in turn, sent to the analog/digital converter 9 and converted into a digital signal. The analog/digital converter 9 sends the digital signal to the focusing signal generating circuit 10.

The focusing signal generating circuit 10 integrates the output signal from the analog/digital converter 9 by the unit of one horizontal interval and sums the resultant integrated values. The resultant summed value is then sent as a focusing signal to the control circuit 11.

By the focusing signal from the focusing signal generating circuit 10, the control circuit 11 generates a control signal which is, in turn, sent to the focusing motor driving circuit 12. The motor driving circuit 12 energizes the focusing motor 13, according to the control signal. By the driving of the motor 13, the focusing lens 1 moves to adjust the focus of the object.

FIG. 1b is a detailed block diagram of the COD driving circuit shown in FIG. 1a. As shown in FIG. 1b, the COD driving circuit comprises an oscillator 3a for generating a signal with a frequency of 28.6363 MHz, a timing signal generator 3b for frequency-dividing the signal of 28.6363 MHz by 2, a synchronizing signal generator 3c for generating a vertical synchronizing signal and a horizontal synchronizing signal and feeding back them to the timing signal generator 3b, in response to an output signal from the timing signal generator 3b, and a vertical-side driver 3d for transferring the vertical synchronizing signal from the timing signal generator 3b to the CCD 4. The timing signal generator 3b also sends directly the horizontal synchronizing signal from the synchronizing signal generator 3c to the CCD 4.

However, the conventional video camera system with the construction of FIG. 1a has the following problems.

Figure 2A:
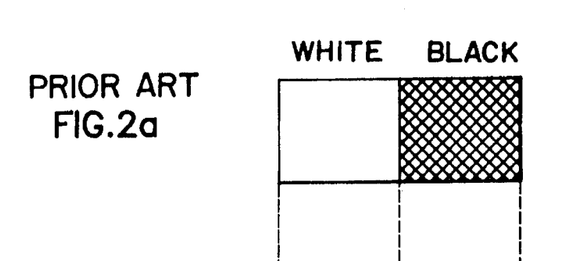
Figures 2B, 2C:
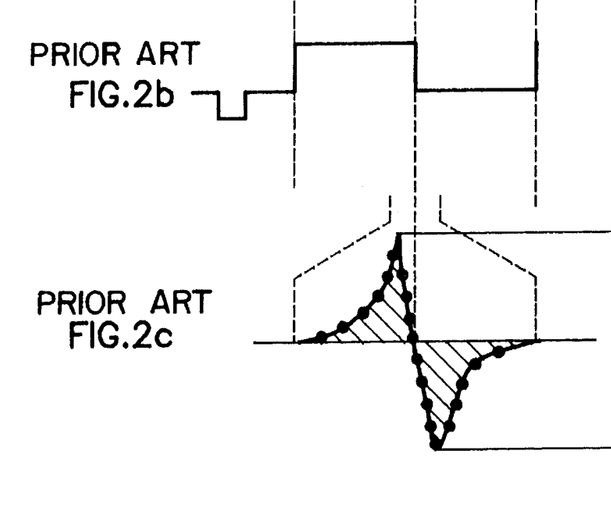
Figure 3A:
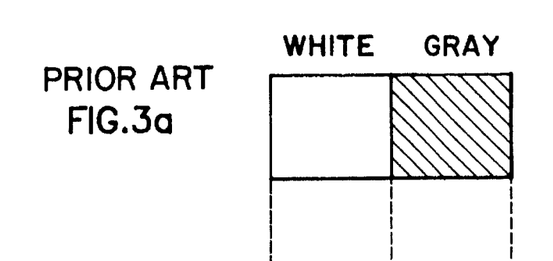
Figures 3B, 3C:
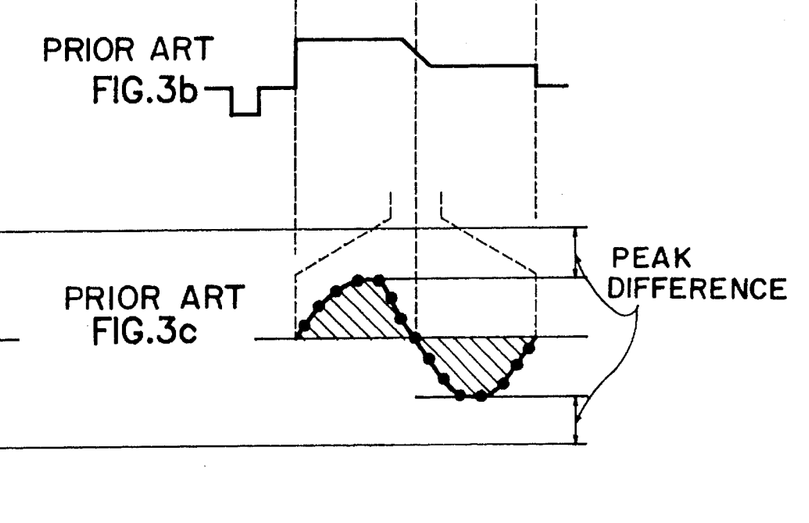

First, where colors of white and black are displayed on a screen, as shown in FIG. 2a, the buffer 7 of FIG. 1a generates a luminance signal shown in FIG. 2b, correspondingly to the colors of FIG. 2a. When colors of white and gray are displayed, as shown in FIG. 3a, it generates a luminance signal shown in FIG. 3b. These luminance signals are then filtered in the band-pass filter 8, thereby producing luminance signal s shown in FIGS. 2c and 3c, respectively. Referring to FIGS. 2c and 3c, it can be found that the boundary between white and black exhibits a higher peak value than the boundary between white and gray. However, the conventional video camera system of FIG. 1a converts such luminance signal s into digital signals through its analog/digital converter 9, without taking the peak values into consideration. These digital signal s are integrated in the focusing signal generating circuit 10 which, in turn, sums the results obtained by the integration and generates a focusing signal based on the summed result. As a result, the boundary between white and black is actually more distinct than the boundary between white and gray, due to a difference in level therebetween, as apparent from FIGS. 2b and 3b. However, the level of the focusing signal for the boundary between white and gray may often be higher than that of the focusing signal for the boundary between white and black, since the levels of the focusing signals outputted from the focusing signal generator 10 of FIG. 1b correspond to shaded areas of FIGS. 2c and 3c, respectively. The shaded area of FIG. 3c is larger than that of FIG. 2c. As a result, the focusing is carried out in a manner that the boundary between white and gray becomes more distinct than the boundary between white and black, even though it should be carried out in a manner that the boundary between white and black becomes more distinct than the boundary between white and gray. This results in degradations in quality of a video signal indicative of an object image and thereby in screen picture quality. Consequently, it causes the user to be unpleased and the reliance for the system to be degraded.

Figure 4:
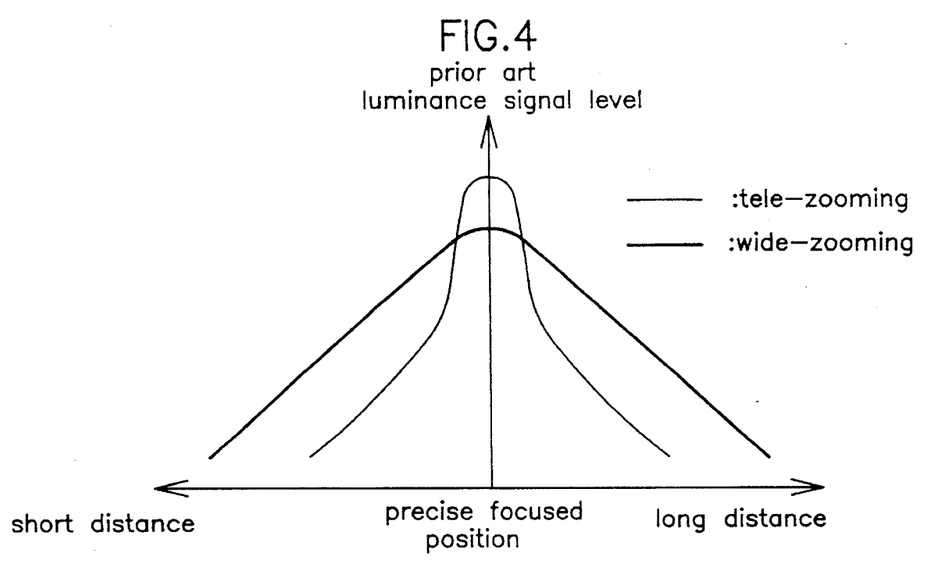
FIG. 4 is a graph for explaining a focusing upon zooming.

Second, the luminance signal from the video signal processing circuit 5 of FIG. 1a passing through the buffer 7 and the band-pass filter 8 is outputted at a level variable depending on a zooming condition of the video camera system. For example, the level of luminance signal varies gently at a tele-zooming mode of the system, according to the driving of the focusing motor 13, as shown in FIG. 4. On the other hand, the level of luminance signal varies sharply at a wide-zooming mode of the system. However, the conventional video camera system performs the focusing by driving the focusing motor 13 at a constant speed, without taking the zooming condition into consideration. At the wide-zooming mode, a precise focused position can be easily found, in that the variation in luminance signal level is gentle. At the tele-zooming mode, however, an oscillation phenomenon may occur upon focusing. That is, the focusing lens passes by the precise focused position and then moves back to the precise focused position, since the driving speed of the focusing motor 13 is high due to the sharp variation in luminance level at the tele-zooming mode. Such an oscillation phenomenon causes the quality of video signals to be degraded and thereby the user to be unpleased.

Figure 5A:
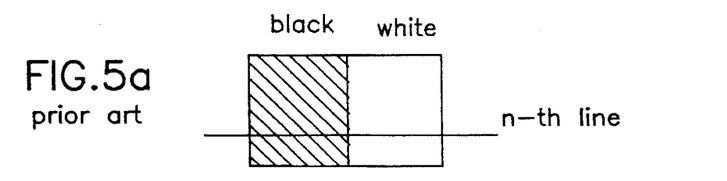
Figure 5B:
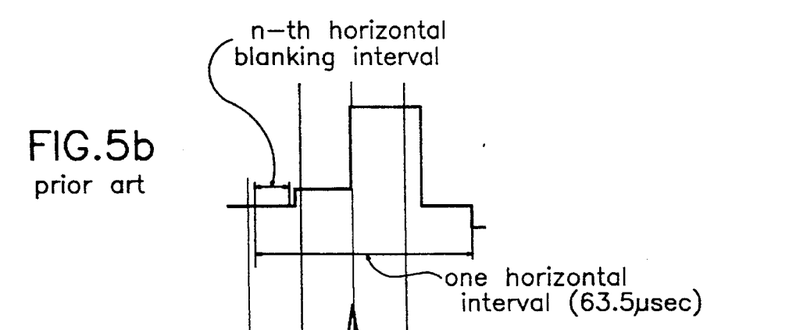
Figure 5C:
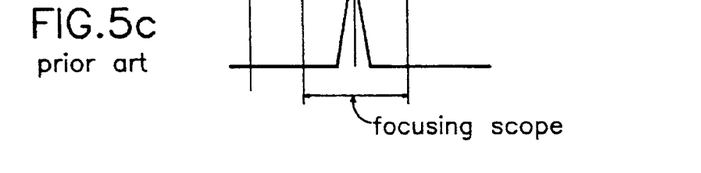
Figure 6A:
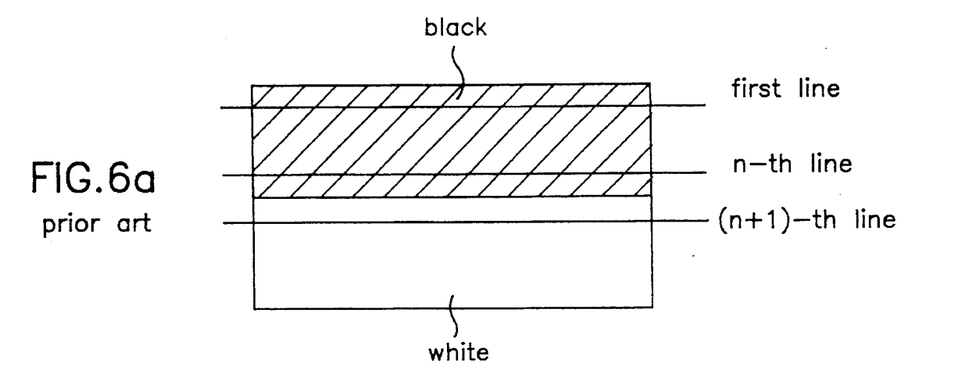
Figure 6B:
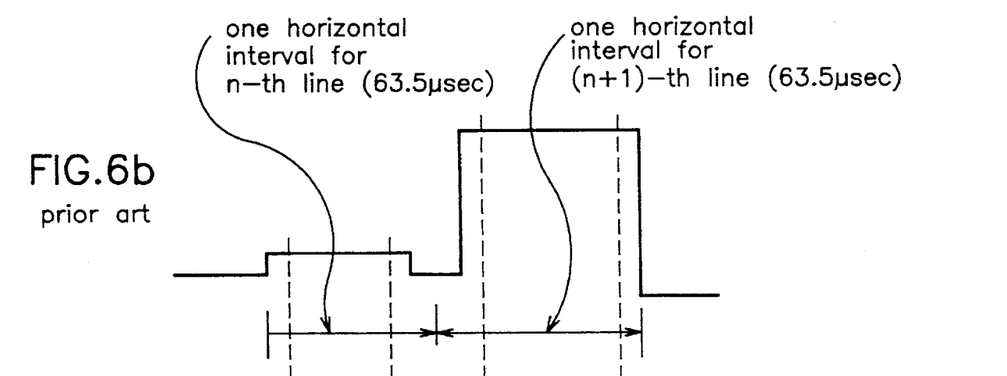
Figure 6C:
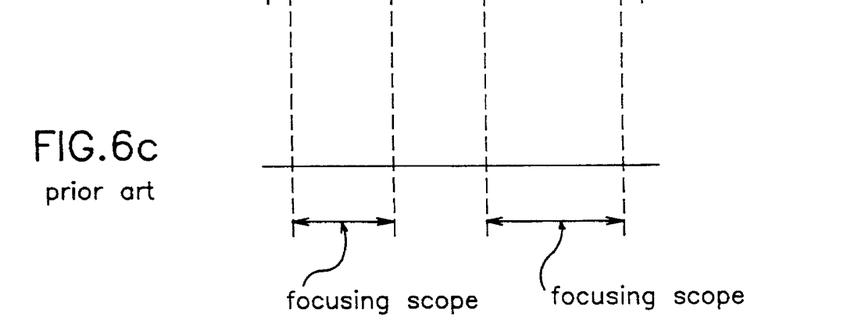

Third, where a frame corresponding to a video signal indicative of an object image is laterally divided into white and black in the video camera system of FIG. 1a, as shown in FIG. 5a, the boundary between white and black is detected within one horizontal interval H1, as shown in FIG. 5b. Also, a high frequency component at the boundary is detected. By the detected high frequency component, it is possible to achieve a precise focusing, as shown in FIG. 5c. Where the frame is vertically divided into white and black, as shown in FIG. 6a, however, the boundary between white and black may be liable to be present beyond a focusing scope, as shown in FIG. 6b. In this case, no high frequency component at the boundary is detected, thereby disabling the precise focusing.

Fourth, the conventional video camera system of FIG. 1a detects only the level of the luminance signal and achieves the focusing, based on the detected luminance signal level. As a result, where an object bearing the same kind of colors with different concentrations or different kinds of colors with the same luminance signal level is shot, the focusing can not be precisely achieved.

SUMMARY OF THE INVENTION

Therefore, an object of the invention is to eliminate the above-mentioned problems encountered in the prior art and to provide a focusing apparatus of a video camera system and a focusing method, capable of achieving a precise focusing even for an image with both a boundary between white and black and a boundary between white and gray.

Another object of the invention is to provide a focusing apparatus of a video camera system and a focusing method, capable of achieving a focusing at a high speed without an oscillation phenomenon, irrespective of a zooming condition.

Another object of the invention is to provide a focusing apparatus of a video camera system and a focusing method, capable of achieving a precise focusing even for an image with both a horizontal luminance signal level and a vertical luminance signal level.

Another object of the invention is to provide a focusing apparatus of a video camera system and a focusing method, capable of achieving a precise focusing even for an object bearing the same kind of colors without a difference in luminance signal level, but with different color concentrations or different kinds of colors with a difference in luminance signal level.

In accordance with one aspect of the present invention, a focusing apparatus is provided which is adapted to detect a peak value of a luminance signal and output it after holding a predetermined time. It also converts the held peak value into a digital signal and integrates it, so as to use the result obtained by the integration as a focusing signal. Accordingly, it is possible to achieve a precise focusing even at the boundary between different colors such as white and black.

In accordance with another aspect of the prevent invention, a focusing apparatus is provided which is adapted to detect a zooming condition so that a focusing motor can driven, based on the detected zooming condition. At the wide-zooming mode, the focusing motor is driven at a gradually increasing speed. At the tele-zooming mode, the focusing motor is driven at a gradually decreasing speed. Accordingly, it is possible to prevent an oscillation from occurring upon focusing and achieve a precise focusing.

In accordance with another aspect of the present invention, a focusing apparatus is provided which is adapted to detect both a horizontal difference and a vertical difference in luminance signal level. The vertical difference in luminance signal level is obtained by subtracting current luminance signal from the luminance signal delayed for one horizontal interval 1H. The horizontal and vertical differences in luminance signal level are summed. The focusing is carried out, based on the sum. Thus, a precise focusing can be achieved.

In accordance with another aspect of the present invention, a focusing apparatus is provided which is adapted to detect color concentration signals as well as a luminance signal and sum them, for achieving a focusing. Accordingly, it is possible to achieve a precise focusing for an object bearing at least two kinds of colors without a difference in luminance signal level, but with differences in color and color concentration, as well as an object bearing at least two kinds of colors with a difference in luminance signal level.

BRIEF DESCRIPTION OF THE DRAWINGS

Other objects and aspects of the invention will become apparent from the following description of embodiments with reference to the accompanying drawings in which:

FIG. 1b is a block diagram of a CCD driving circuit of the focusing apparatus shown in FIG. 1a;

FIGS. 2a to 2c are diagrams for explaining a focusing for a frame with white and black, by the focusing apparatus of FIG. 1a;

FIGS. 3a to 3c are diagrams for explaining a focusing for a frame with white and gray, by the focusing apparatus of FIG. 1a;

FIGS. 5a to 5c are diagrams for explaining a focusing for a frame with white and black laterally arranged, by the focusing apparatus of FIG. 1a;

FIGS. 6a to 6c are diagrams for explaining a focusing for a frame with white and black vertically arranged, by the focusing apparatus of FIG. 1a;

DETAILED DESCRIPTION OF THE PREFERRED EMBODIMENTS

Referring to FIGS. 7 to 15, there are illustrated first to fourth embodiments of the present invention which will be described hereinafter.

First Embodiment

Figure 7:
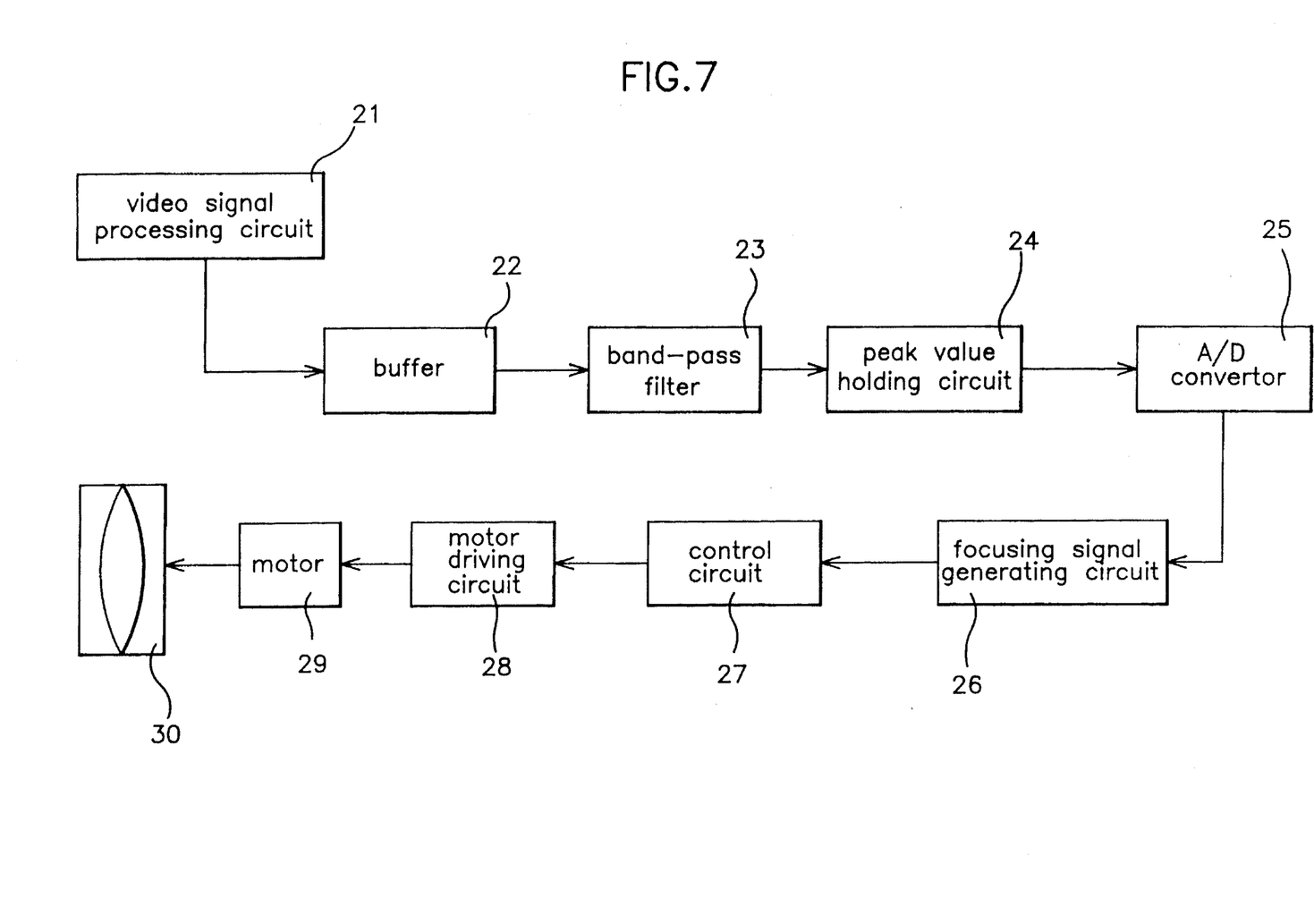
FIG. 7 is a block diagram of a focussing apparatus of a video camera system, in accordance with a first embodiment of the present invention.

FIG. 7 is a block diagram of an automatic focusing apparatus of a video camera system according to the first embodiment of the present invention.

As shown in FIG. 7, the focusing apparatus comprises a video signal processing circuit 21 for detecting color difference signals R-Y and B-Y and a luminance signal Y from an optical video signal indicative of an image of an object, a buffer 22 for buffering the luminance signal Y from the video signal processing circuit 21, a band-pass filter 23 for passing a particular frequency band of the luminance signal Y outputted from the buffer 22, a peak value holding circuit 24 for detecting a peak value of the luminance signal Y passing through the band-pass filter 23 and holding it for a predetermined time, and an analog/digital converter 25 for converting an output signal from the peak value holding circuit 24 into a digital signal. Also, a focusing signal generating circuit 26 is provided which is adapted to integrate an output signal from the analog/digital converter 25 by the unit of one horizontal interval, sum integrated values obtained by the integration and output the result as a focusing signal. The focusing apparatus also comprises a control circuit 27 for generating a motor driving control signal, according to the control signal from the focusing signal generating circuit 26, and a motor driving circuit 28 for generating a motor driving signal according to the control signal from the control circuit 27. A focusing moron 29 and a focusing lens 30 are also provided. The focusing motor 29 is driven according to the motor driving signal from the motor driving circuit 28, to move the focusing lens 30 for focusing.

Although not shown, the focusing signal generating circuit 26 includes an integrator for integrating digital signals received from the analog/digital converter 25 by the unit of one horizontal interval and an adder for summing the integrated values.

Operation of the focusing apparatus with the above-mentioned construction of FIG. 7 will now be described.

As an object is shot by the video camera system which is powered on, an optical video signal indicative of an image of the object is fed to the video signal processing circuit 21 in which the received video signal is divided into color difference signals R-Y and B-Y and a luminance signal Y. The luminance signal Y from the video signal processing circuit 21 is sent to the buffer 22 in which it is buffered and then sent to the band-pass filter 23. The band-pass filter 23 outputs only a particular frequency band of the luminance signal Y which is, in turn, sent to the peak value holding circuit 24. The peak value holding circuit 29 detects a peak value of the luminance signal Y outputted from the band-pass filter 23 and holds the detected peak value, so as to output it continuously. The peak value of the luminance signal Y outputted from the peak value holding circuit 24 is sent to the analog/digital converter 25 and converted into a digital signal. The analog/digital converter 25 sends the digital signal to the focusing signal generating circuit 26.

The focusing signal generating circuit 26 integrates the output signal from the analog/digital converter 25 by the unit of one horizontal interval and sums the resultant integrated values. The resultant summed value is then sent as a focusing signal to the control circuit 27.

By the focusing signal, the control circuit 27 generates a control signal which is, in turn, sent to the focusing motor driving circuit 28. The motor driving circuit 28 energizes the focusing motor 29, according to the control signal. By the driving of the motor 29, the focusing lens 30 moves to adjust the focus of the object.

Figure 8A:
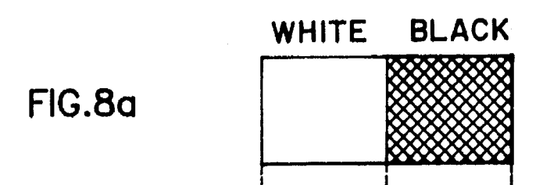
FIGS. 8a to 8d are diagrams for explaining a focusing for a frame with white and black laterally arranged, by the focusing apparatus of FIG. 7.
Figure 8B:
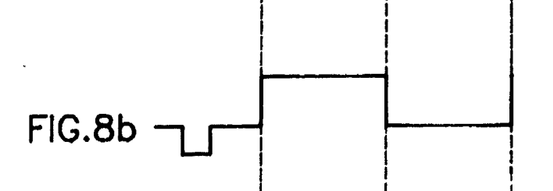
Figure 8C:
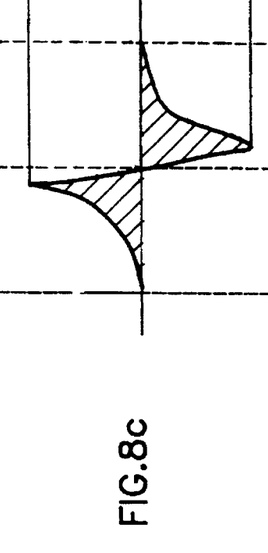
Figure 8D:
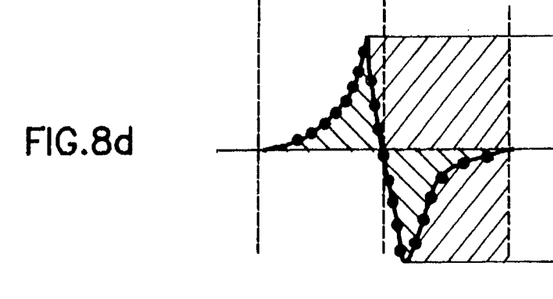
Figure 9A:
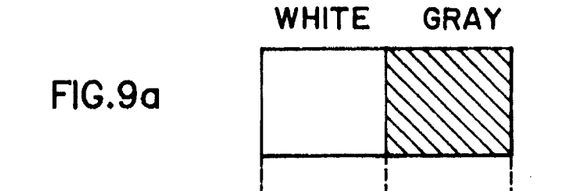
FIGS. 9a to 9d are diagrams for explaining a focusing for a frame with white and gray laterally arranged, by the focusing apparatus of FIG. 7.
Figure 9B:
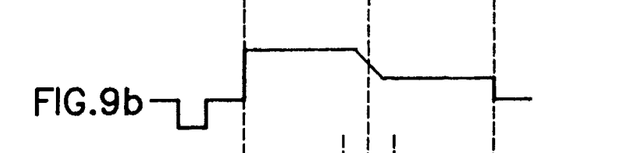
Figure 9C:
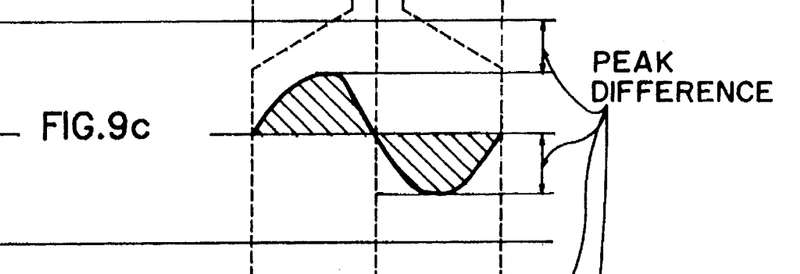
Figure 9D:
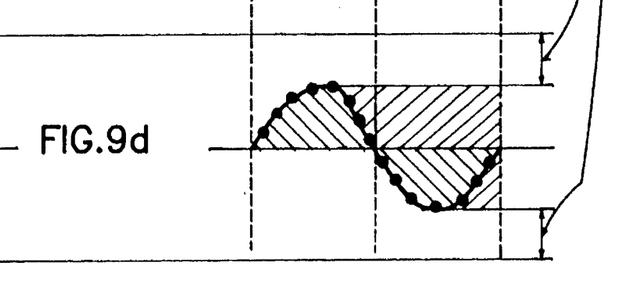

Upon receiving video signals indicative of a frame of white and black and of a frame of white and gray, the buffer 22 outputs luminance signals Y which have waveforms shown FIG. 8b and FIG. 9b, respectively. These luminance signals of FIGS. 8b and 9b are filtered in the band-pass filter 23 so that their particular frequency band components are outputted, as sown in FIGS. 8c and 9c. By the peak value holding circuit 24, respective peak values of the signals outputted from the band-pass filter 23 are detected as shown in FIGS. 8d and 9d and held to be continuously outputted for a predetermined time. Each output signal from the peak value holding circuit 24 is converted into a digital signal in the analog/digital converter 25. The digital signal is integrated by the unit of one horizontal interval and summed in the focusing signal generating circuit 26. The resultant summed value is sent as a focusing signal to the control circuit 27.

Referring to FIGS. 8*d* and 9*d*, it can be found that the shaded area of FIG. 8*d* is larger than that of FIG. 9*d*. Accordingly, the focusing is achieved such that the boundary between white and black is more distinct than the boundary between white and gray.

As apparent from the above description, the focusing apparatus according to the first embodiment of the present invention is adapted to detect a peak values of a luminance signal and output it after holding a predetermined time. It also converts the held peak value into a digital signal and integrates it, so as to use the result obtained by the integration as a focusing signal. Accordingly, it is possible to achieve a precise focusing even at the boundary between different colors such as white and black. This results in an improvement in quality of a video signal indicative of an object image and an improvement in reliance.

Second Embodiment

Figure 10:
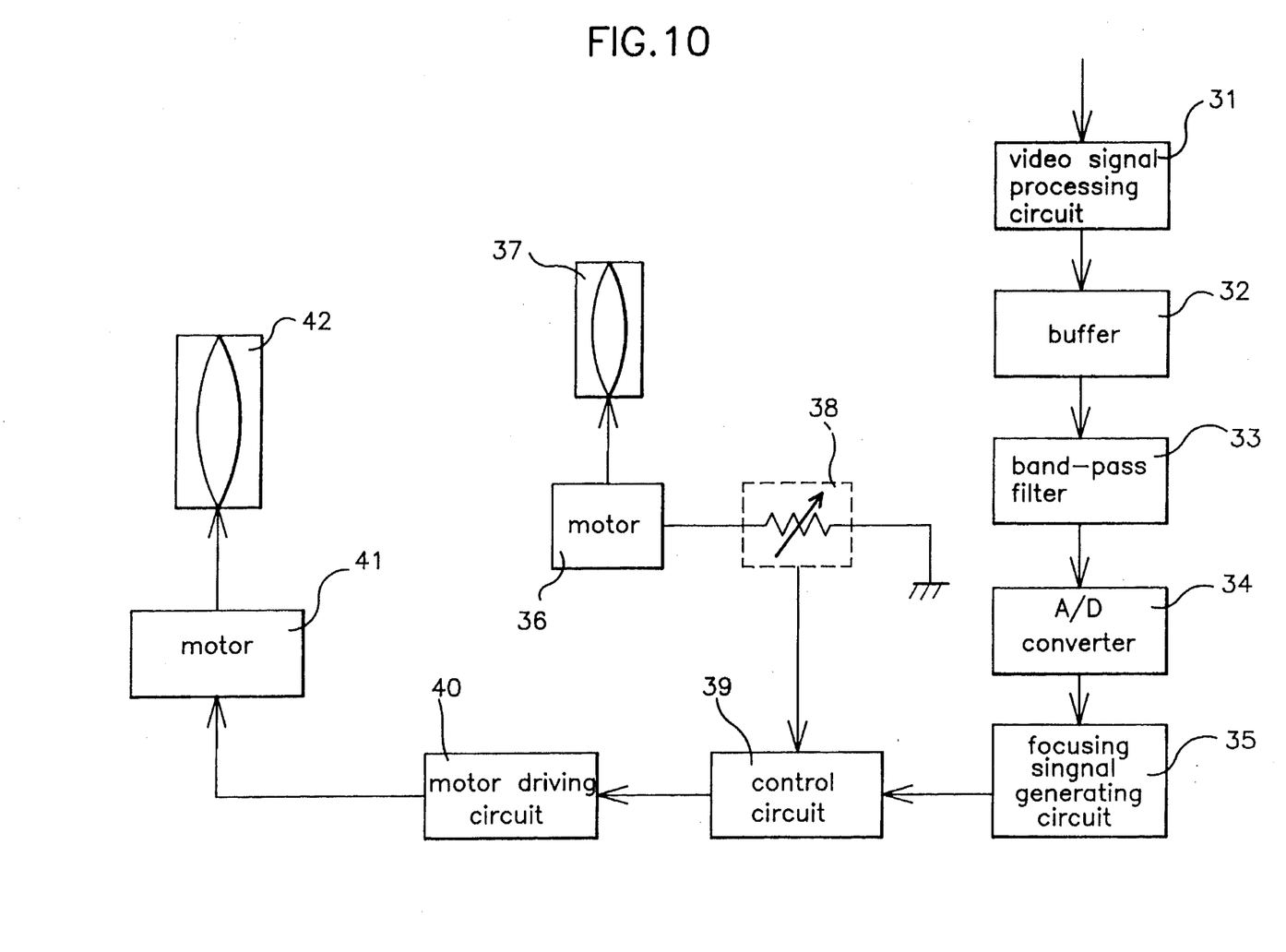
FIG. 10 is a block diagram of a focusing apparatus of a video camera system, in accordance with a second embodiment of the present invention.

FIG. 10 is a block diagram of an automatic focusing apparatus of a video camera system according to the second embodiment of the present invention.

As shown in FIG. 10, the focusing apparatus comprises a video signal processing circuit 31 for detecting color difference signals and a luminance signal Y from an optical video signal indicative of an image of an object, a buffer 32 for buffering an output signal from the video signal processing circuit 31, a band-pass filter 33 for passing a particular frequency band of the output signal from the buffer 32, and an analog/digital converter 34 for converting an output signal from the band-pass filter 33 into a digital signal. Also, a focusing signal generating circuit 35 is provided which is adapted to integrate the digital signal from the analog/digital converter 34 by the unit of one horizontal interval, sum integrated values obtained by the integration and output the result as a focusing signal. The focusing apparatus also comprises a zooming motor 36, a zooming lens 37 for zooming the object according to a rotation of the zooming motor 36, a zooming mode detecting circuit 38 for detecting a zooming mode, based on an operation condition of the zooming motor 36 and outputting a zooming mode detecting signal corresponding to a tele-zooming mode or a wide-zooming mode, a control circuit 39 for generating a motor driving control signal, according to the control signal from the focusing signal generating circuit 35 and the zooming mode detecting signal from the zooming mode detecting circuit 38, and a motor driving circuit 40 for generating a motor driving signal according to the control signal from the control circuit 39. A focusing motor 41 and a focusing lens 42 are also provided. The focusing motor 41 is driven according to the motor driving signal from the motor driving circuit 40, to move the focusing lens 42 for focusing.

In accordance with this embodiment, the focusing apparatus also may comprises a peak value holding circuit connected between the band-pass filter 33 and the analog/digital converter 34, so as to achieve a precise focusing for a boundary between different colors. The peak value holding circuit may be the same as the peak value holding circuit 24 of FIG. 7 and is adapted to detect a peak value of the luminance signal Y outputted from the band-pass filter 33 and hold it for a predetermined time.

The zooming mode detecting circuit 38 may comprise a variable resistor which is operatively connected to the zooming motor 36 and has a resistance variable depending on the zooming mode.

Although not shown, the focusing signal generating circuit 35 includes an integrator for integrating digital signals received from the analog/digital converter 34 and an adder for summing the integrated values.

Operation of the focusing apparatus with the above-mentioned construction of FIG. 10 will now be described.

As an object is shot by the video camera system, optical video signal indicative of an image of the object fed to an image sensor (not shown) via the focusing lens 41 an iris (not shown), the image sensor converts the received optical video signal into an electrical video signals and then sends it to the video signal processing circuit 31. In the video signal processing circuit 31, the video signal divided into color difference signals R-Y and B-Y and a luminance signal Y. The luminance signal Y from the video signal processing circuit 31 is sent to the buffer 32 in which it is buffered and then sent to the band-pass filter 33. The band-pass filter 33 outputs only a particular frequency band of the luminance signal Y which is, in turn, sent to the analog/digital converter 34. The analog/digital converter converts the output signal from the band-pass filter 33 into a digital signal and sends it to the focusing signal generating circuit 35. The focusing signal generating circuit 35 integrates the output signal from the analog/digital converter 34 and sums the resultant integrated values. The resultant summed value is then Bent as a focusing signal to the control circuit 39.

Based on the level of the focusing signal, the control circuit 39 generates a control signal which is, in turn, sent to the focusing motor driving circuit 40. The motor driving circuit 40 energizes the focusing motor 41, according to the control signal. By the driving of the motor 41, the focusing lens 42 moves to adjust the focus of the object.

As the zooming motor 36 is driven, the zooming mode detecting circuit 37, namely, the variable resistor operatively connected with the zooming motor 36 varies in resistance and generates a zooming mode signal corresponding to the tele-zooming mode or the wide-zooming mode, which zooming mode signal is, in turn, sent to the control circuit 39.

Based on the received zooming mode signal indicative of the varied resistance of the variable resistor, the control circuit 39 determines the zooming mode and adjusts the level of control signal according to the result obtained by the determination. The adjusted control signal is then sent to the motor driving circuit 39.

Accordingly, the focusing motor 41 varies in rotation speed, based on the varied control signal. The level of the control signal increases gradually, as the position value in a wide-zooming direction increases. In this case, the focusing motor driving circuit 40 brings the focusing motor 41 to rotate at a higher speed and thus the focusing lens 42 to move at a higher speed. Thus, the focusing can be achieved at a high speed. On the other hand, the level of control signal decreases gradually, as the positional value in a tele-zooming direction increases. In this case, the focusing motor driving circuit 40 brings the focusing motor 41 to rotate at a lower speed and thus the focusing lens 42 to move at a lower speed. Accordingly, the focusing can be achieved without any oscillation.

As apparent from the above description, the focusing apparatus according to the second embodiment of the present invention is adapted to detect the zooming condition by the zooming motor 36 so that the focusing motor 41 can driven, based on the detected zooming condition. At the wide-zooming mode, the focusing motor 41 is driven at a gradually increasing speed. At the tele-zooming mode, the focusing motor 41 is driven at a gradually decreasing speed. Accordingly, it-is possible to prevent an oscillation from occurring upon focusing and achieve a precise focusing.

Third Embodiment

Figure 11:
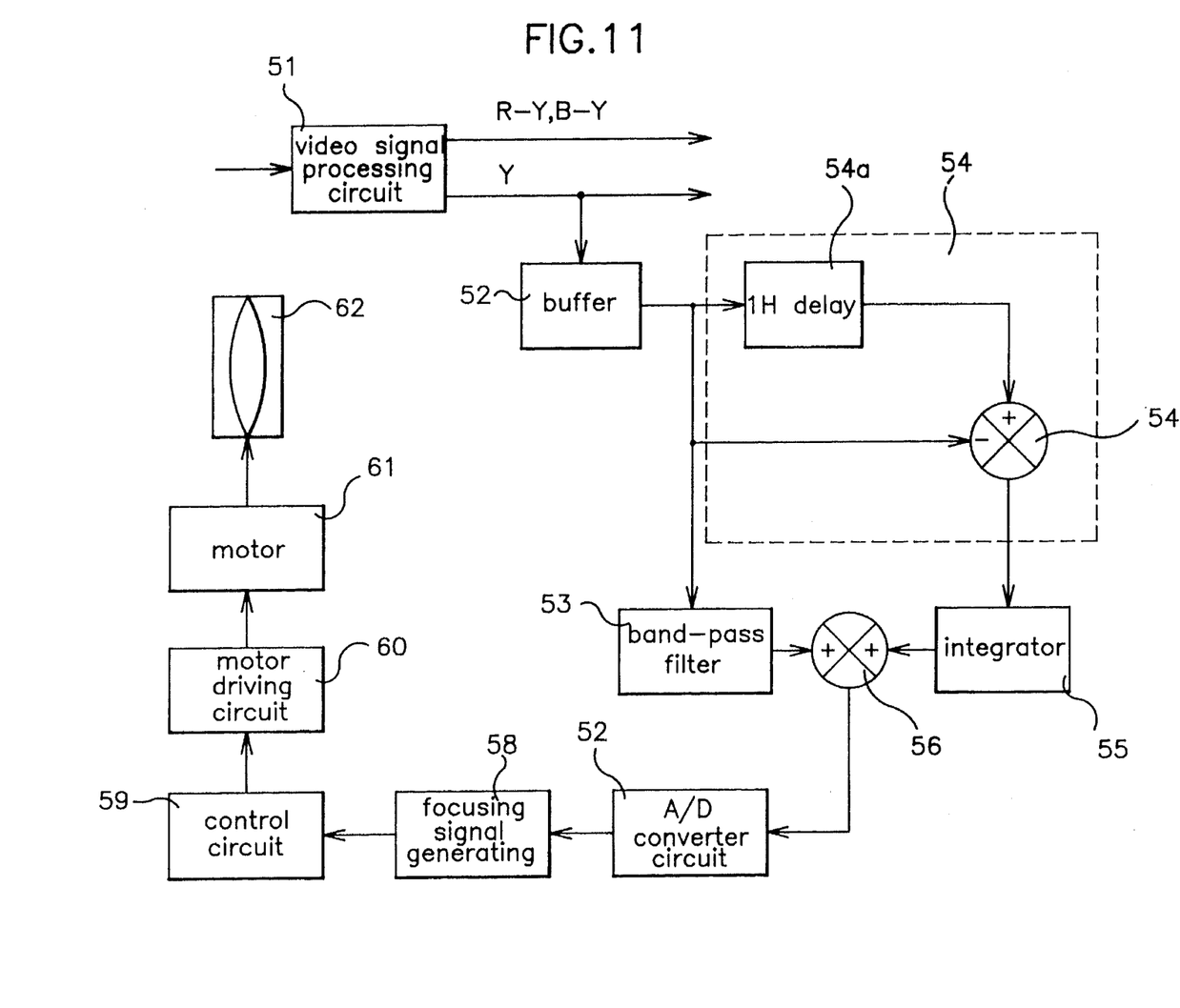
FIG. 11 is a block diagram of a focusing apparatus of a video camera system, in accordance with a third embodiment of the present invention.

FIG. 11 is a block diagram of an automatic focusing apparatus of a video camera system according to the third embodiment of the present invention.

As shown in FIG. 11, the focusing apparatus comprises a video signal processing circuit 51 for obtaining color difference signals and a luminance signal Y from an electrical video signal indicative of an image of an object, a buffer 52 for buffering the luminance signal Y from the video signal processing circuit 51, a band-pass filter 53 for passing a particular frequency band of the luminance signal Y outputted from the buffer 52, a luminance signal variation detecting circuit 54 for detecting a vertical luminance signal variation from an output signal from the buffer 52, by the unit of one horizontal interval (1H), an integrator 55 for integrating output signals from the luminance signal variation detecting circuit 54, an adder 56 for summing an output signal from the band-pass filter 53 and an output signal from the integrator 55, and an analog/digital converter 57 for converting an output signal from the adder 56 into a digital signal, by the unit of one horizontal interval. Also, a focusing signal generating circuit 58 is provided which is adapted to integrate an output signal from the analog/digital converter 57 by the unit of one horizontal interval, sum integrated values obtained by the integration and output the result as a focusing signal. The focusing apparatus also comprises a control circuit 59 for generating a motor driving control signal, according to the control signal from the focusing signal generating circuit 58, and a motor driving circuit 60 for generating a motor driving signal according to the control signal from the control circuit 59. A focusing motor 61 and a focusing lens 62 are also provided. The focusing motor 61 is driven according to the motor driving signal from the motor driving circuit 59, to move the focusing lens 62 for focusing.

In similar to the first embodiment of FIG. 7, the focusing apparatus also may comprise a peak value holding circuit connected between the adder 56 and the analog/digital converter 57, so as to achieve a precise focusing, even for an object with white and black or an object with white and gray.

As shown in FIG. 11, the luminance signal variation detecting circuit(namely, a vertical boundary processing circuit) 54 includes an 1H delay 54a for delaying the luminance signal Y outputted from the buffer 52 for one horizontal interval 1H and a subtractor 54b for subtracting the output signal of the buffer 52 from an output signal of the 1h delay 54a and outputting the result at the integrator 55.

The focusing signal generating circuit 58 includes an integrator for integrating a digital signal received from the analog/digital converter 57 and an adder for summing the integrated values.

Operation of the focusing apparatus with the above-mentioned construction of FIG. 11 will now be described.

As an object is shot by the video camera system which is powered on, an electrical video signal indicative of an image of the object is fed to the video signal processing circuit 51 which, in turn, detects color difference signals R-Y and B-Y and a luminance signal Y from the received video signal. The luminance signal Y from the video signal processing circuit 51 is sent to the buffer 52 in which it is buffered and then sent to both the 1H delay 54a and the subtractor 54b of the vertical boundary processing circuit 54. The 1H delay 54a delays the luminance signal Y outputted from the buffer 52 for one horizontal interval 1H and sends it to the subtractor 54b. The subtractor 54b subtracts the output signal of the buffer 52 from an output signal of the 1H delay 54a and detects a vertical luminance signal variation according to the result obtained by the subtraction. This detected vertical luminance signal variation is subjected to an integration in the integrator 55 which, in turn, sends the result obtained by the integration to the adder 56.

The output signal from the buffer 52 is also sent to the band-pass filter 53. The band-pass filter 53 permits only a particular frequency band of the luminance signal Y to pass therethrough and thus detects a horizontal luminance signal variation. This horizontal luminance signal variation is also sent to the adder 56. Accordingly, the adder 56 sums the vertical luminance signal variation and the horizontal luminance signal variation and outputs the sum.

An output signal from the adder 56 is sent to the analog/digital converter 57 and converted into a digital signal by the unit of one horizontal interval 1H. The digital signal is then integrated by the unit of one horizontal interval in the focusing signal generating circuit 58 which, in turn, sums the resultant integrated values. The resultant summed value is then sent as a focusing signal to the control circuit 59.

Based on the horizontal and vertical variations of the luminance signal, the control circuit 59 generates a corresponding control signal which is, in turn, sent to the focusing motor driving circuit 60. The motor driving circuit 60 outputs a motor driving signal, in response to the control signal. According to the motor driving signal, the focusing motor 61 drives, thereby causing the focusing lens 62 to move to adjust the focus of the object.

As apparent from the above description, the focusing apparatus according to the third embodiment of the present invention is adapted to detect both a horizontal difference and a vertical difference in luminance signal level. The vertical difference in luminance signal level is obtained by subtracting current luminance signal from the luminance signal delayed for one horizontal interval 1H. The horizontal and vertical differences in luminance signal level are summed. The focusing is carried out, based on the sum. Thus, a precise focusing can be achieved.

Fourth Embodiment

Figure 12:
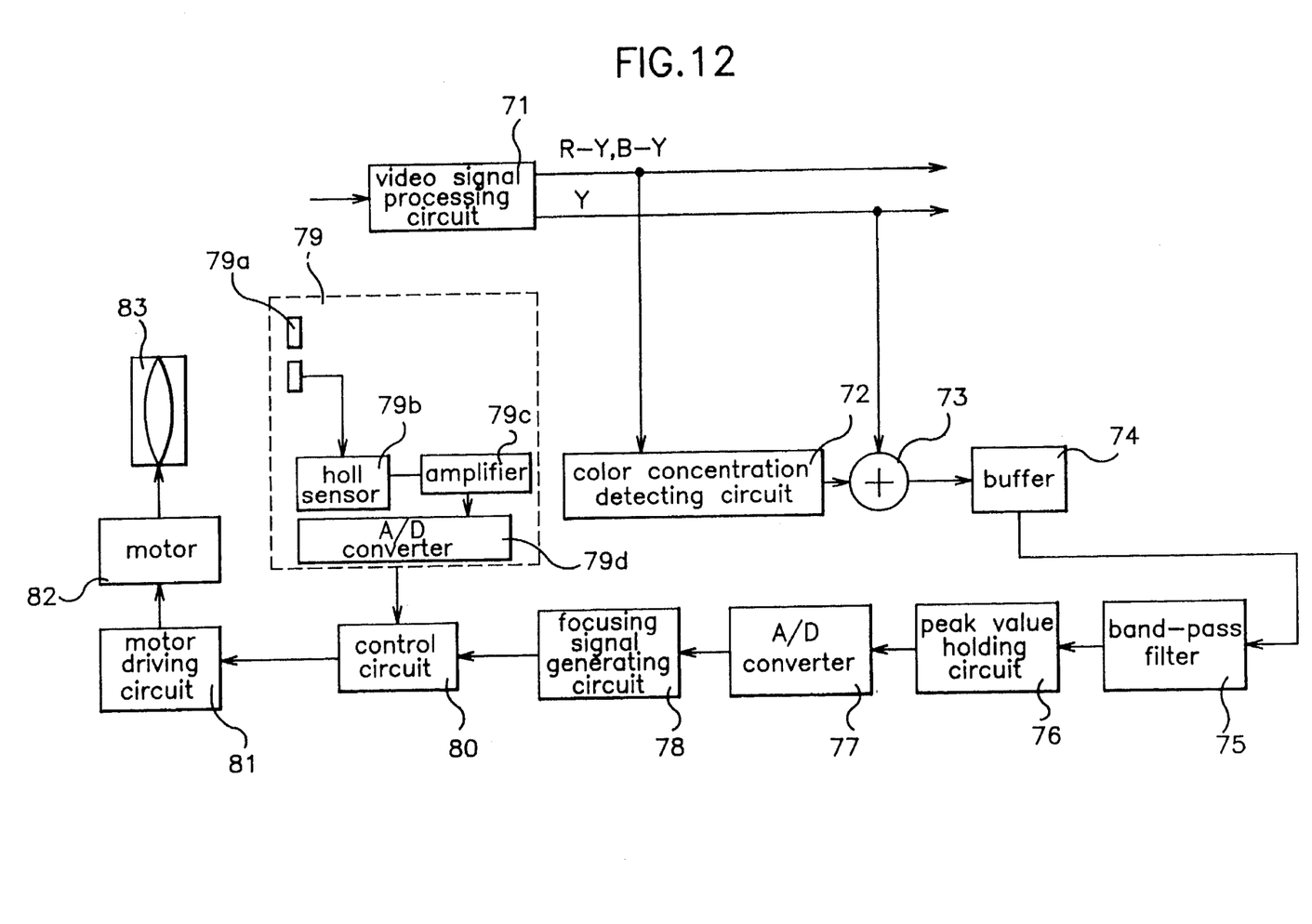
FIG. 12 is a block diagram of a focusing apparatus of a video camera system, in accordance with a fourth embodiment of the present invention.

FIG. 12 is a block diagram of an automatic focusing apparatus of a video camera system according to the fourth embodiment of the present invention.

As shown in FIG. 12, the focusing apparatus comprises a video signal processing circuit 71 for obtaining color difference signals R-Y and B-Y and a luminance signal Y from an electrical video signal indicative of an image of an object, a color concentration detecting circuit 72 for obtaining a difference in phase between two colors with the same luminance and respective envelopes of two colors with different concentrations from the color difference signals R-Y and B-Y, an adder 73 for summing the luminance signal Y from the video signal processing circuit 71 and an output signal from the color concentration detecting circuit 72, a buffer 74 for buffering an output signal from the adder 73, a band-pass filter 75 for passing a particular frequency band of an output signal from the buffer 74, a peak value holding circuit 76 for detecting a peak value of an output signal from the band-pass filter 75 and holding, namely, outputting it for a predetermined time, and an analog/digital converter 77 for converting an output signal from the peak value holding circuit 76 into a digital signal. Also, a focusing signal generating circuit 78 is provided which is adapted to integrate an output signal from the analog/digital converter 77 by the unit of one horizontal interval, sum integrated values obtained by the integration and output the result as a focusing signal. The focusing apparatus also comprises an iris opening sensing circuit 79 for sensing the opening degree of an iris 79a, a control circuit 80 for generating a motor driving control signal, according to an output signal from the iris opening sensing circuit 79 and the focusing signal from the focusing signal generating circuit 78, and a motor driving circuit 81 for generating a motor driving signal according to the control signal from the control circuit 80. A focusing motor 82 and a focusing lens 83 are also provided. The focusing motor 82 is driven according to the motor driving signal from the motor driving circuit 81, to move the focusing lens 83 for focusing.

Figure 13:
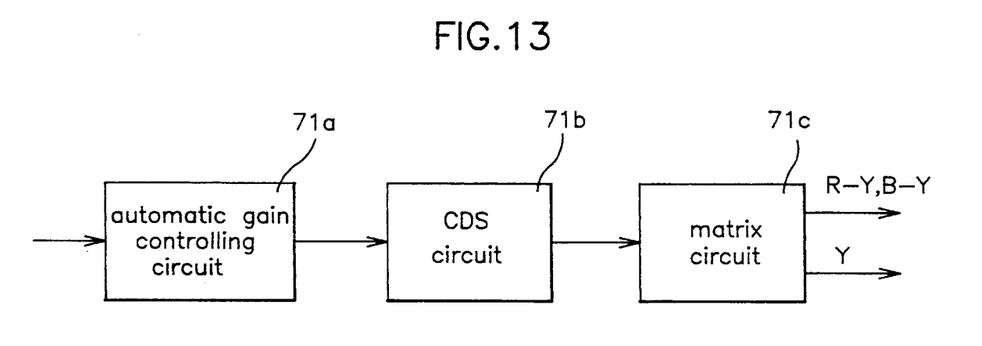
FIG. 13 is a diagram for explaining the video signal processing circuit of the fourth embodiment.

As shown in FIG. 13, the video signal processing circuit 71 comprises an automatic gain control circuit 71a for controlling automatically a gain for an electrical video signal received therein, a correlated double sampling (CDS) circuit 71b for removing a reset noise, and a matrix circuit 71c for detecting color difference signals R-Y and B-Y and a luminance signal Y from the electrical video signal free of the reset noise. This construction of the video signal processing circuit 71 are equivalently employed for respective video signal processing circuits of the first to third embodiments.

As shown in FIG. 12, the iris opening sensing circuit 79 includes the iris 79a for controlling the amount of optical video signals indicative of the object image, according to an illuminance of surroundings, a hole sensor 79b for sensing the amount of holes passing through the iris 79a, an amplifier 79c for amplifying an output signal from the hole sensor 79b, and an analog/digital converter 79d for converting an output signal from the amplifier 79c into a digital signal and sending it to the control circuit 80.

Figure 14:
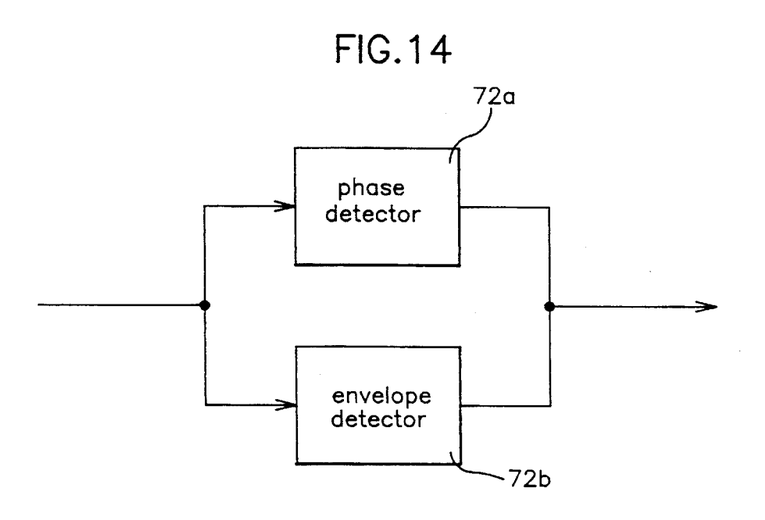
FIG. 14 is a block diagram of a video signal processing circuit which is employed in the first to fourth embodiments of the present invention.

As shown in FIG. 14, the color concentration detecting circuit 72 includes a phase boundary detector 72a for receiving the color difference signals from the video signal processing circuit 71 and detecting a phase boundary between two colors from the received color difference signals, so as to recognize a boundary between two colors with the same luminance. The color concentration detecting circuit 72 also includes an envelope boundary detector 72b for detecting respective envelopes of the color difference signals, so as to recognize an envelope boundary between colors with the same luminance, but different color concentrations.

In similar to the previous embodiments, the focusing signal generating circuit 78 includes an integrator for integrating a digital signal received from the analog/digital converter 77 by the unit of one horizontal interval and an adder for summing the integrated values.

Operation of the focusing apparatus with the above-mentioned construction of FIG. 12 will now be described.

As an object is shot by an image sensor (not shown) of the video camera system, an optical video signal indicative of an image of the object is fed to the video signal processing circuit 71 which, in turn, processes the received video signal, to detect color difference signals R-Y and B-Y and a luminance signal Y. The color difference signals R-Y and B-Y and luminance signal Y from the video signal processing circuit 71 are sent to the color concentration detecting circuit 72. From the received signals, the color concentration detecting circuit 72 detects peak values at the boundary between two colors with the same luminance and at the boundary between two colors of the same kind with the same luminance, but different color concentrations, respectively. The detected peak values are sent to the adder 73.

Figure 15A:
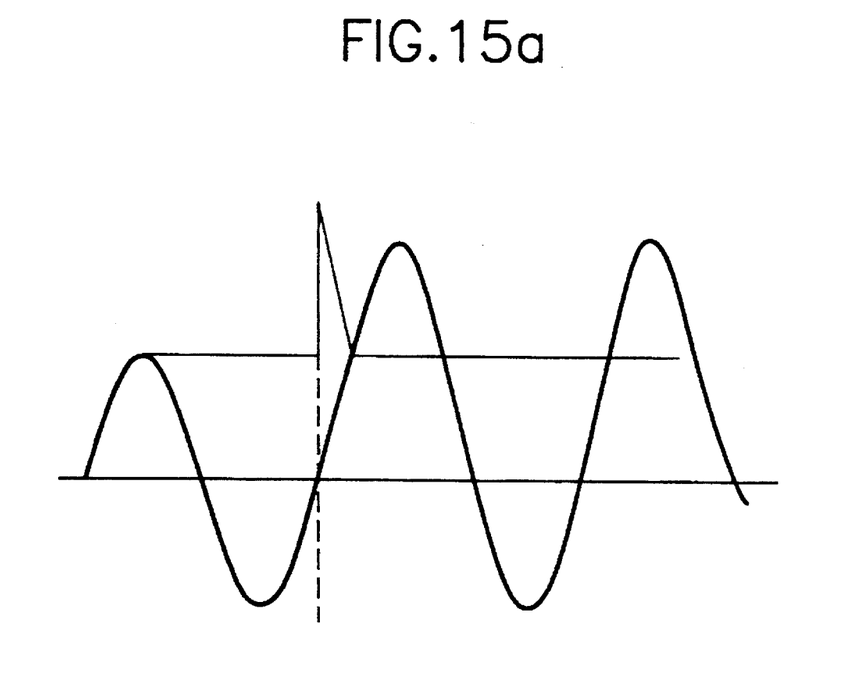
FIG. 15a is a diagram for explaining a focusing for a frame bearing two colors with the same luminance, by the focusing apparatus of FIG. 12.
Figure 15B:
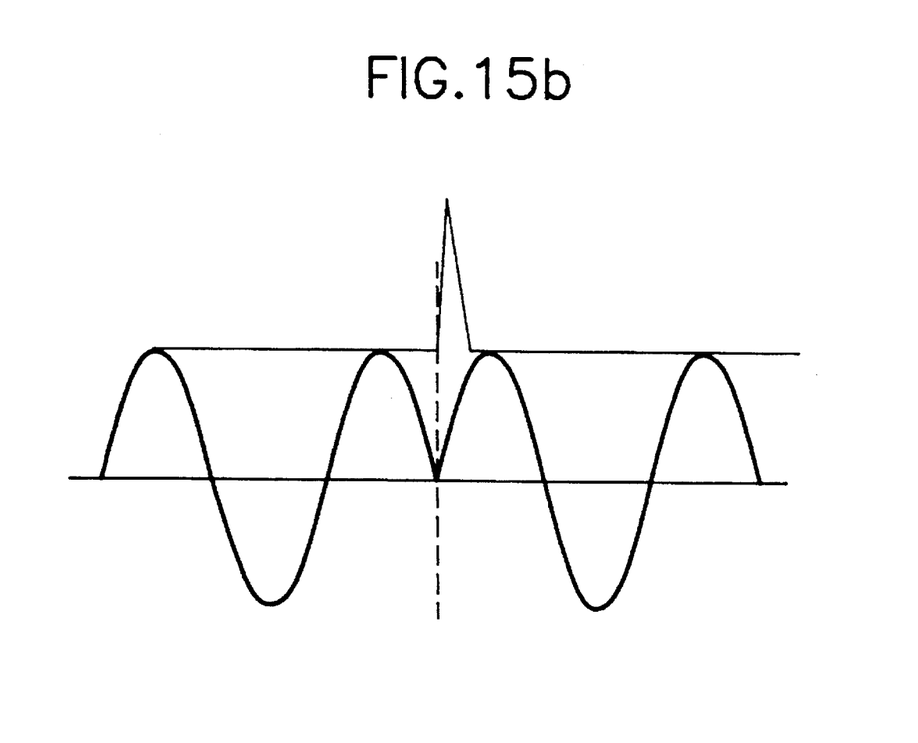
FIG. 15b is a diagram for explaining a focusing for a frame bearing two colors with different color concentrations, by the focusing apparatus of FIG. 12.

That is, where chrominance signals have the same phase, but different levels caused by a difference in concentration, as in a dark red and a light red, the color concentration detecting circuit 72 detects an envelope corresponding to the difference in chrominance signal level, so that the peak value at the boundary between the concentrations is detected, as shown in FIG. 15a. Where luminance signals have little difference in level, but a difference in phase caused by a color difference, as in a red and a green, the color concentration detecting circuit 72 detects a peak value at the boundary between the color signal phases and sends it to the adder 73.

The adder 73 also receives the luminance signal Y outputted from the video signal processing circuit 71, so that it sums the luminance signal Y and an output signal from the color concentration detecting circuit 72 and outputs the sum. An output signal from the adder 73 is sent to the buffer 74 in which it is buffered and then sent to the band-pass filter 75. The band-pass filter 75 outputs only a particular frequency band of the luminance signal Y which is, in turn, sent to the peak value holding circuit 76. The peak value holding circuit 76 detects a peak value of the luminance signal Y outputted from the band-pass filter 75 and holds the detected peak value for a predetermined time. An output signal from the peak value holding circuit 76 is sent to the analog/digital converter 77 and converted into a digital signal. The analog/digital converter 77 sends the digital signal to the focusing signal generating circuit 78.

The focusing signal generating circuit 78 integrates the output signal from the analog/digital converter 77 by the unit of one horizontal interval and sums the resultant integrated values. The resultant summed value is then sent as a focusing signal to the control circuit 80. At this time, the iris opening sensing circuit 79 senses the opening degree of the iris 79a and sends its sensing signal to the control circuit 80. Accordingly, the control circuit 80, generates a motor driving control signal, based on the received sensing signal indicative of the opening degree of the iris 79a and the focusing signal. This control signal is sent to the motor driving circuit 81. Thus, a precise focusing can be achieved, in that the control signal is obtained by taking into consideration the color difference signals as well as the luminance signals.

Subsequent procedures are the same as the first to third embodiments and a description thereof is thus omitted.

As apparent from the above description, the focusing apparatus according to the fourth embodiment of the present invention is adapted to detect color difference signals as well as luminance signals and sum them, for achieving a focusing. Accordingly, it is possible to achieve a precise focusing for an object bearing at least two kinds of colors without a difference in luminance signal level, but with differences in color and color concentration, as well as an object bearing at least two kinds of colors with a difference in luminance signal level. This results in an improvement in quality of a video signal indicative of an object image and an improvement in reliance.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An auto-focusing method for video camera system, comprising the steps of:

receiving an optical video signal indicative of an image of an object and detecting color difference signals and luminance signals;

extracting only the luminance signals from the detected signals;

sampling/holding the level of the luminance signals within a predetermined period of reference time;

obtaining the maximum peak value and the minimum peak value of sampled/held values;

obtaining a focus value by performing a focus value generating operation including the maximum and minimum peak values as operation data for the focus value; and moving a focus lens so that the focus value becomes the maximum value.

2. The method of claim 1, further comprising the step of filtering a specific frequency band of the luminance signals extracted at said extracting step.

3. An automatic focusing apparatus for video camera system comprising:

means for receiving an optical video signal indicative of an image of an object in detecting color difference signals and luminance signals;

means for extracting only the luminance signals from the signals detected by said means for receiving;

means for sampling/holding the level of the extracted luminance signals within a predetermined period of reference time;

means for obtaining the maximum peak value and the minimum peak value of sampled/held values from said means for sampling/holding;

means for obtaining a focus value by performing a focus value generating operation wherein the obtained maximum and minimum peak values function as operation data for the focus value; and means for moving a focus lens so that the obtained focus value becomes the maximum value.

4. The automatic focusing apparatus of claim 3, further comprising means for buffering the extracted luminance signals.

5. The automatic focusing apparatus of claim 4, further comprising means for filtering a specific frequency band of the buffered luminance signals from said means for buffering.

6. The automatic focusing apparatus of claim 3, further comprising means for controlling said means for moving based on an output signal generated from said means for obtaining the focus value.

7. The automatic focusing apparatus of claim 3, further comprising means for filtering a specific frequency band of the extracted luminance signals.

* * * * *